US 6,743,130 B2

(12) United States Patent  
Konno et al.

(10) Patent No.: US 6,743,130 B2
(45) Date of Patent: Jun. 1, 2004

(54) MOVABLE LEVER FOR TRANSMISSION CHAIN

(75) Inventors: Masahiko Konno, Osaka (JP); Kozo Inoue, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 95 days.

(21) Appl. No.: 10/237,648

(22) Filed: Sep. 9, 2002

(65) Prior Publication Data

US 2003/0064842 A1 Apr. 3, 2003

(30) Foreign Application Priority Data

Oct. 2, 2001 (JP) .......................... 2001-306848

(51) Int. Cl.[7] .............................. F16H 57/04; F16H 7/08
(52) U.S. Cl. ........................................ 474/111; 474/91
(58) Field of Search .......................... 474/111, 140, 474/91; 184/11.1–11.5

(56) References Cited

U.S. PATENT DOCUMENTS 5,647,811 A * 7/1997 Mott ............................ 474/91
5,720,682 A * 2/1998 Tada ............................ 474/91
5,868,638 A * 2/1999 Inoue et al. .................. 474/110

FOREIGN PATENT DOCUMENTS

JP          3253951  B1   11/2001

* cited by examiner

Primary Examiner—Thomas R. Hannon
(74) Attorney, Agent, or Firm—Howson and Howson

(57) ABSTRACT

A movable lever for a transmission chain, which is able to pivot smoothly, and avoid seizing on its supporting shaft, comprises a unitary, molded resin lever body composed of a chain-engaging shoe and a plate-receiving portion, and a reinforcing plate in a slot in the plate-receiving portion. The plate and the plate-receiving portion have coaxial, cofastening mounting holes which receive the mounting shaft. Reinforcing ribs are provided on a side of the plate-receiving portion and their ends are notched to provide grooves which promote the flow of oil, which accumulates on the lever, toward the mounting holes so that adequate lubrication of the mounting hole in the plate is achieved.

1 Claim, 6 Drawing Sheets

1 …

MOVABLE LEVER FOR TRANSMISSION CHAIN

FIELD OF THE INVENTION

This invention relates to a movable lever which cooperates with a tensioner to impart tension to a chain transmitting power from a driving sprocket to one or more driven sprockets in an automobile engine.

BACKGROUND OF THE INVENTION

In general, in a power transmission as an automobile engine timing drive or the like, an endless transmission chain circulates around a driving sprocket and one or more driven sprockets, and a lever, pivotally mounted on an interior wall of the engine by a mounting bolt, mounting pin, or the like, is in sliding engagement with the chain, and cooperates with a tensioner to impart appropriate tension to the chain.

In a conventional movable lever for a transmission, as shown in FIG. 5, a lever body 10 includes a shoe 11 having a surface on which a traveling transmission chain (not shown) is in sliding contact, and a plate-receiving portion 12 extending longitudinally on the back side of the shoe 11. The shoe and plate-receiving portion are integrally molded of synthetic resin. A steel reinforcing plate 20, which reinforces the lever body 10, fits into an open slot 12a in the plate-receiving portion 12, the slot extending along the longitudinal direction of the lever. The lever body and reinforcing plate are mounted on an inner wall (not shown) of an engine by a mounting bolt P (FIG. 6), which is inserted through cofastening mounting holes 12b and 21 provided in the lever body 10 and the steel reinforcing sheet 20, respectively.

A plurality of reinforcing ribs 12e, such as shown in FIGS. 5 and 6, are formed on a side of the plate-receiving portion 12. These reinforcing ribs are disposed in an array which extends from the vicinity of the mounting hole 12b along the lever in the longitudinal direction. The reinforcing ribs 12e prevent deformation of the lever body 10, which is likely to occur as a result of sliding contact with the transmission chain, and also enhance the strength of the lever body 10.

Where a conventional movable lever is used, engine oil O, in the form of a mist produced during operation of the engine, agglomerates and adheres to the lever body 10. However, the flow of the engine oil toward the mounting hole 12 is impeded by the plurality of reinforcing ribs 12e. Accordingly, it is not possible for adequate quantities of engine oil to reach, and flow into, the mounting hole 21 in the steel reinforcing sheet 20. As a result seizing of the steel reinforcing sheet 20 to the mounting bolt P can occur, preventing pivoting of the lever.

The problem of seizing between the steel reinforcing sheet 20 and the mounting bolt P, can be avoided if the movable lever formed entirely of resin, and the steel reinforcing sheet 20 is eliminated. However, if the reinforcing sheet is eliminated, the strength of the lever is reduced, and the durability of the lever is significantly impaired, especially when the lever is used in a high temperature environment.

Accordingly, the principal objects of the invention are to solve the above-described problems, and to provide a movable lever, which is able to avoid seizing on a mounting bolt or other supporting shaft by effectively utilizing engine oil as a lubricant, and which is able to pivot smoothly in cooperation with a tensioner and thereby impart appropriate tension to a transmission chain.

SUMMARY OF THE INVENTION

To address the above objects, the movable tensioning lever in accordance with the invention comprises an elongated lever body and a steel reinforcing plate. The lever body includes a shoe having front and back sides. The front side is a surface for sliding contact with a chain. The lever body also includes a plate-receiving portion on the back side of the shoe, extending along the longitudinal direction of the lever body, and having an elongated slot also extending along the longitudinal direction of the lever body and opening in a direction facing away from the shoe in a direction perpendicular to the front side. The shoe and plate-receiving portion are integrally molded as a unit from synthetic resin. The steel reinforcing plate fits into the slot, and the lever body and reinforcing plate have coaxial mounting holes in register with each other adjacent one end of the lever body for cofastening engagement with a supporting shaft mounted on an inner wall of an engine. Reinforcing ribs are formed on a laterally outward facing surface of said plate-receiving portion. The reinforcing ribs are disposed in an array extending from the vicinity of the mounting holes along the plate-receiving portion in the longitudinal direction of the lever body. In accordance with the invention, oil guide grooves, for guiding oil to the mounting holes, are composed of notches formed in end portions of the reinforcing ribs.

The synthetic resin of which the lever body is composed is not particularly limited. Synthetic resins such as nylon 6, nylon 66, all aromatic nylons and the like, known as "engineering plastics," have superior durability and lubricating properties, and are preferably used, since the chain-contacting sliding surface functions as a shoe. Where exceptional strength is required, a fiber-reinforced resin may also be used.

The array of reinforcing ribs, which extends from the vicinity of the co-fastening mounting holes along the longitudinal direction of the lever, may have any of a wide variety of configurations, such as a truss form, a wave form, a vein-shaped form, and the like.

The depth of the oil guiding groove can vary. For example, the notches which constitute the groove can extend to the full depth of the ribs, or can extend partially through the depths of the ribs. For example, notches which extend through half the depth of ribs can provide improved results in guiding oil toward the co-fastening mounting holes.

The lever can be mounted on any of various mounting devices provided on an inner wall of an engine, including a mounting bolt, a pin, or other shaft-type support.

With a movable lever for a transmission chain according to the invention the following benefits can be obtained.

When a floating mist of oil generated in an engine during operation agglomerates and adheres to a lever mounted upright on a shaft on an inner wall of an engine, the oil flows downward along the longitudinal direction of the lever.

The oil passes smoothly downward through the oil guide groove constituted by notches formed in end portions of the reinforcing ribs. The flow of oil takes place without being impeded by the multiple reinforcing ribs, and the oil flows into the mounting hole of the lever body and into a cofastening mounting hole of the steel reinforcing plate, so that the oil penetrates between the steel reinforcing plate and the supporting shaft.

Lubricant is always present in adequate quantity between the reinforcing steel sheet and the mounting shaft. Consequently, appropriate tension is imparted, by a tensioner, through the lever, to a transmission chain which slides along the shoe of the lever. The lever pivots smoothly on its mounting shaft about one end of the lever without seizing between the steel reinforcing plate and the shaft.

DETAILED DESCRIPTION OF THE PREFERRED EMBODIMENTS

Figure 1:
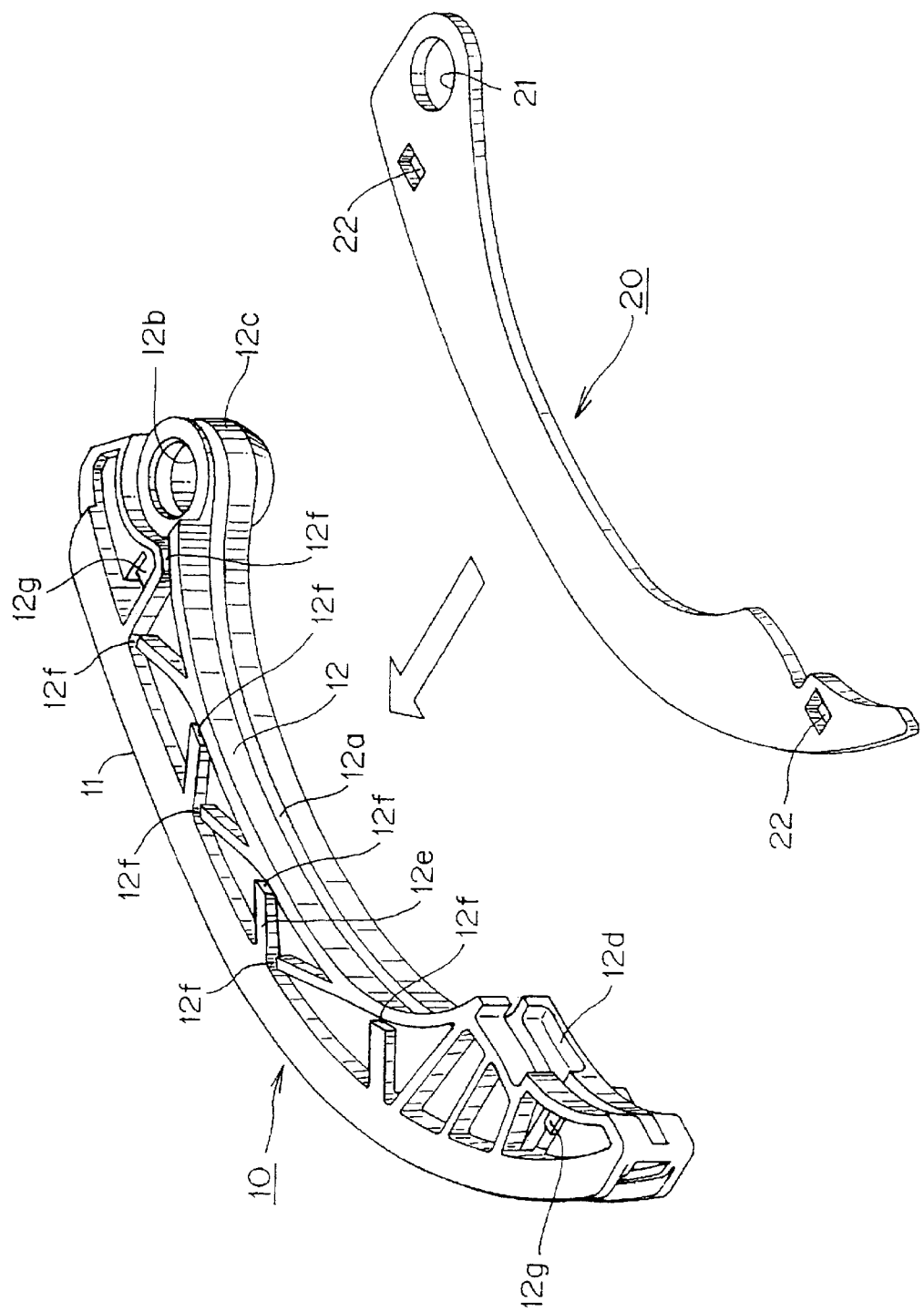
FIG. 1 is an exploded view of a movable lever for a transmission chain, in accordance with the invention.

As shown in FIG. 1, a preferred movable lever according to the invention has a two-piece structure comprising a lever body 10, integrally molded of a synthetic resin, and a steel reinforcing plate 20, punched from a steel sheet. The steel reinforcing plate 20 is inserted into the lever body 10 in the direction of the arrow shown in FIG. 1.

The lever body 10 comprises a shoe 11 having a sliding surface on which a traveling transmission chain can slide, and a plate-receiving portion 12 provided on the back side of the shoe 11 and molded as a unit with the shoe. The plate-receiving portion preferably extends perpendicular to the sliding surface and along the longitudinal direction of the lever. The plate-receiving portion 12 includes a slot 12a on an edge of the plate-receiving portion facing away from the shoe 11. The slot is open along the longitudinal direction of the lever. The lever body includes a boss 12c, having a mounting hole 12b for mounting the lever body on a bolt or other suitable mounting shaft on the inner wall of an engine. The lever body also has a tensioner contacting portion 12d, for engagement by, and cooperation with, a tensioner T (not shown).

Figure 2:
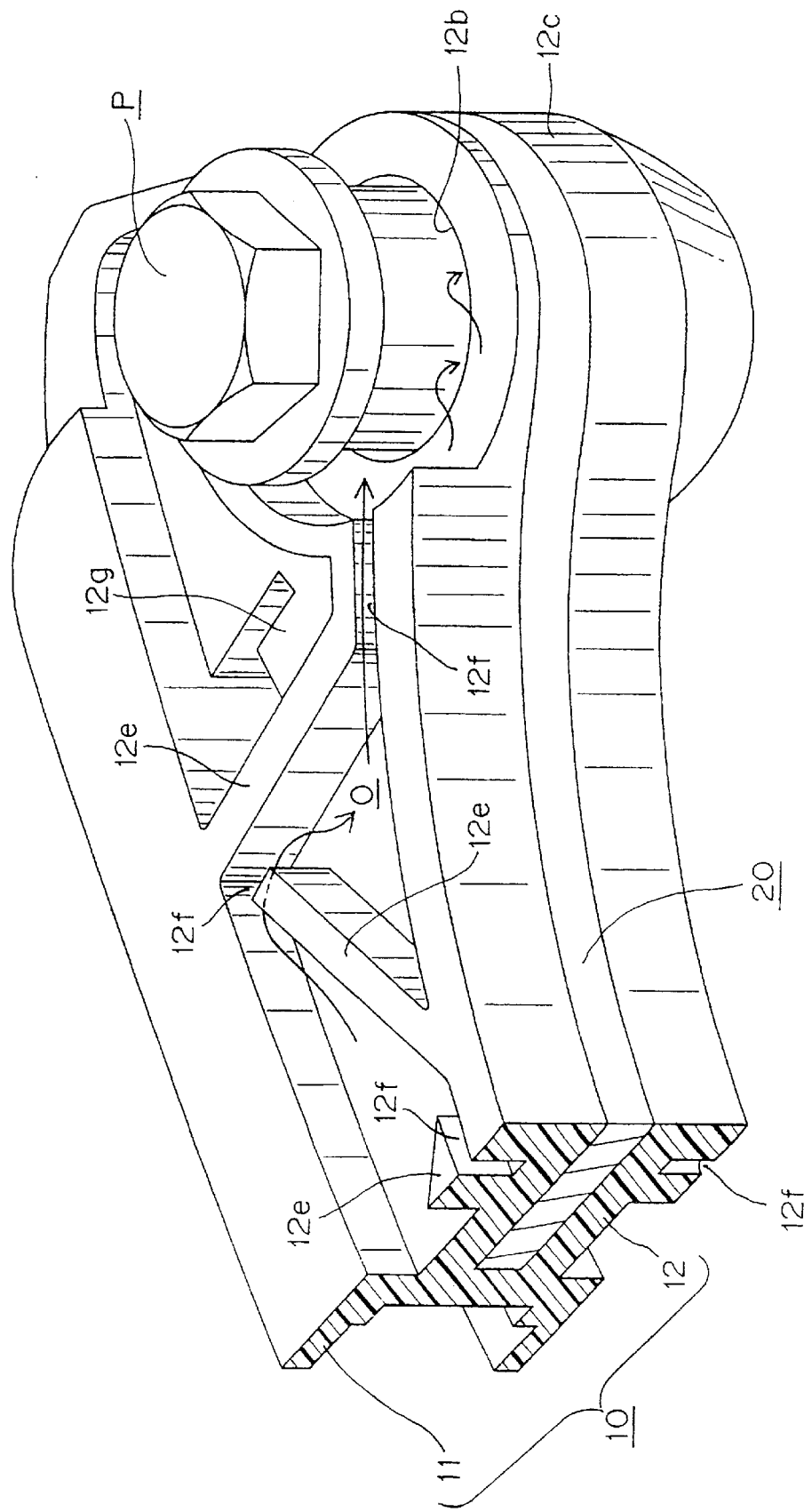
FIG. 2 is an enlarged view of a portion of the lever of FIG. 1.

As shown in FIG. 2, reinforcing ribs 12e, for reinforcing the lever structure, are disposed in an array on a side of the plate-receiving portion 12 of the lever body, at least in the vicinity of the mounting hole 12b. The array of reinforcing webs 12e extends along the longitudinal direction of the lever. A notch is formed at an end of each of the reinforcing ribs 12e to provide a groove for guiding oil toward the mounting hole 12b. A protruding locking piece 12g is provided as a part of the plate-receiving portion 12 for locking the steel reinforcing plate 20 in slot 12a in the lever body 10. A locking opening 22 is provided in the plate 20 for engagement with the locking piece 12g.

The steel reinforcing plate 20 includes a cofastening mounting hole 21 at a position corresponding to the position of mounting hole 12b of the lever body 10. When the reinforcing plate is installed in the slot of the lever body, holes 21 and 12b are in coaxial relationship to each other, and both receive a mounting bolt P (FIG. 2) or other suitable supporting means.

The lever is assembled by fitting the steel reinforcing plate 20 into the slot 12a in the lever body 10 from the side opposite the chain-engaging face of the shoe 11. The assembly consisting of the lever body 10 and the reinforcing plate 20 is attached to an inner wall of an engine by a bolt P or other suitable supporting shaft, which passes through both mounting holes 12b and 21.

Since the shoe and the plate-receiving portion are integrally molded as a unit, it is not necessary to provided a separate shoe member. Accordingly the number of parts, and the number of production steps is minimized.

The steel reinforcing plate 20 improves the rigidity and strength of the lever while achieving a reduction in the overall weight of the lever. The steel reinforcing plate 20 can be produced by punching in a punching press, thereby minimizing production cost while achieving good accuracy so that difficulties in the assembly of the lever are avoided.

When the lever is used in a high temperature environment, such as in an engine, even if there is a difference between coefficients of thermal expansion of the lever body 10 and the steel reinforcing plate 20, deformation and breakage of the lever due to thermal effects are avoided. The lever body and plate are rigidly held together, by a mounting bolt or shaft, only at the ends at which the cofastening mounting holes 12b and 21 are provided. The other ends of the lever body and reinforcing plate are free to move relative to each other in the longitudinal direction at least through a limited range. Accordingly thermal expansion does not cause deformation and breakage of the lever.

Figure 4:
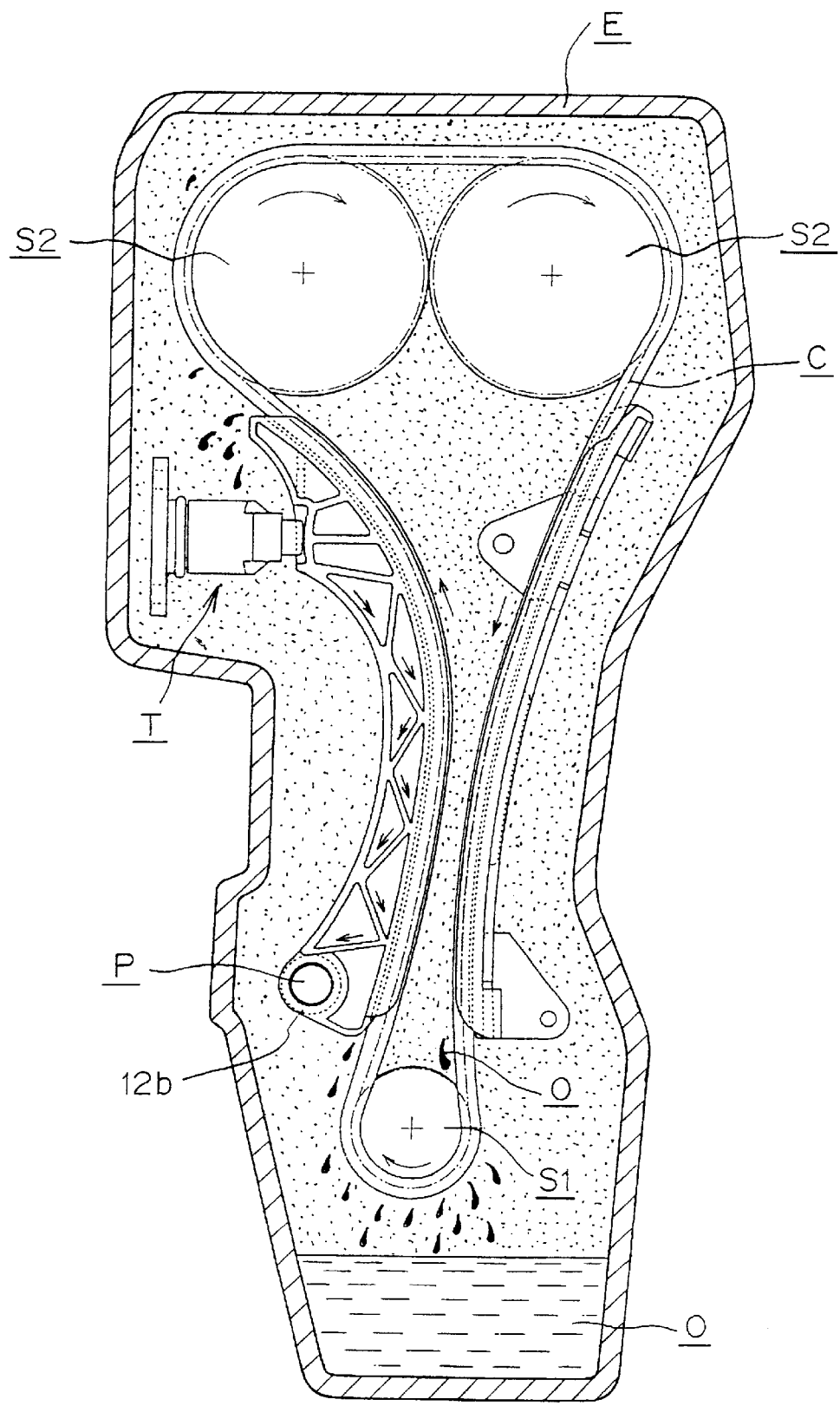
FIG. 4 is an elevational view showing the view of the movable lever for the transmission chain in an engine.
Figure 5:
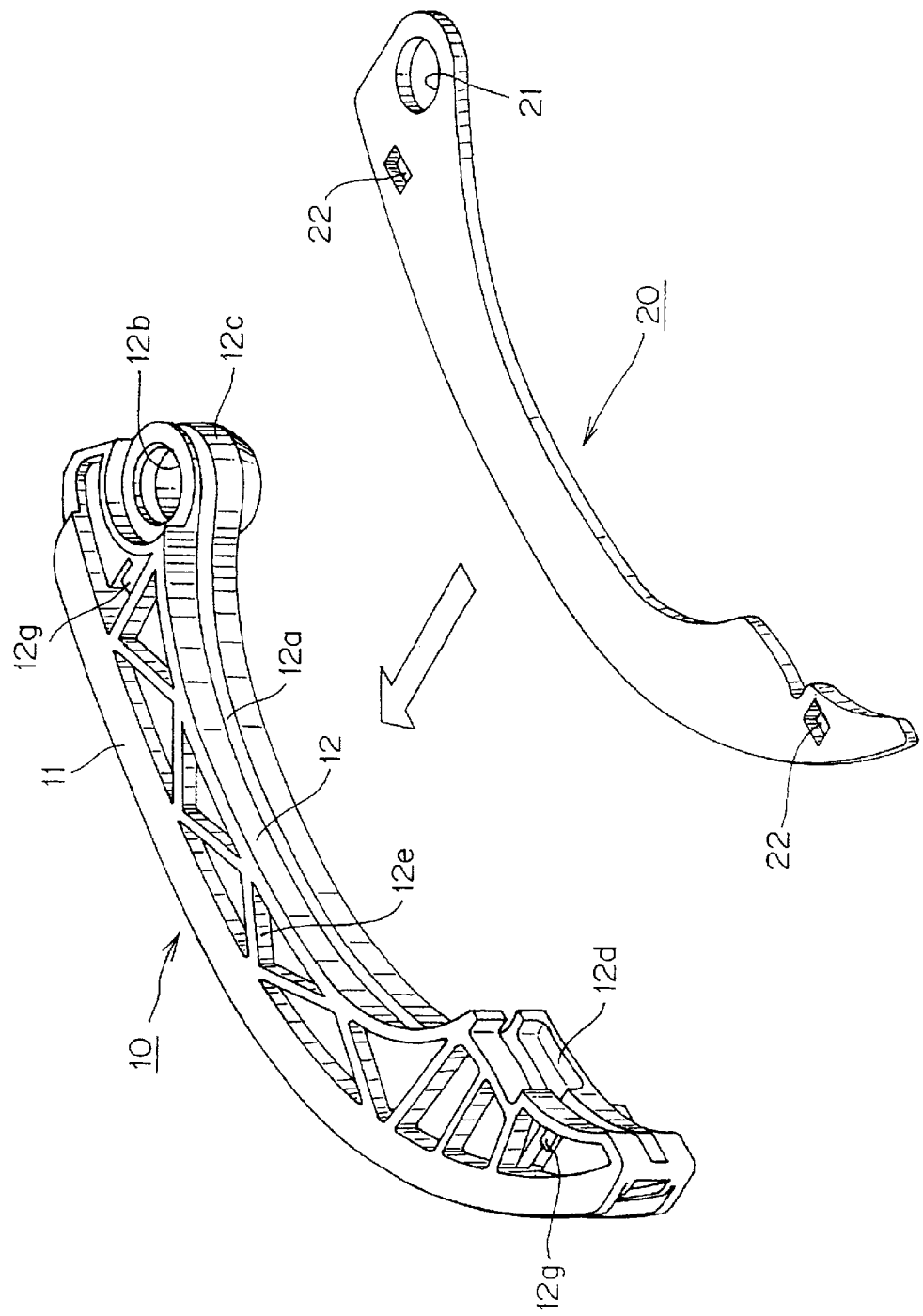
FIG. 5 is an exploded view of a conventional movable lever for a transmission chain.

As shown in FIG. 4, the lever in accordance with the invention is typically mounted upright on a mounting bolt P on an inner wall of an engine, with its tensioner contact portion 12d at an upper position and its cofastening mounting hole 21 at a lower position. Accordingly, when engine oil O, in the form of a mist generated in the engine, agglomerates and adheres to the lever body 10, the oil flows downward longitudinally along the lever.

Figure 3A:
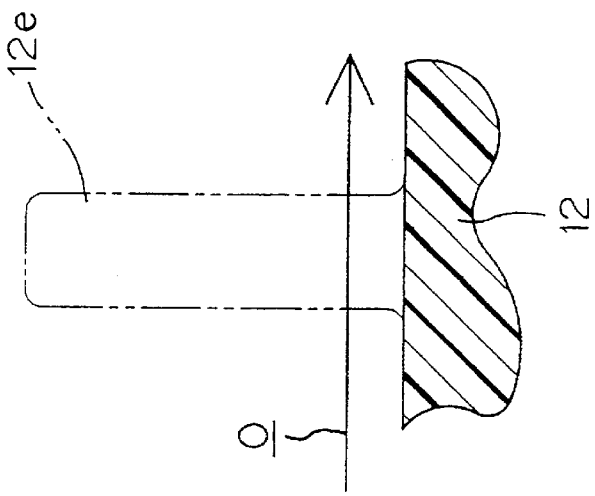
FIGS. 3(a), 3(b), and 3(c) are schematic views showing the flow of engine oil relative to a reinforcing rib near the proximal end of the guide, respectively in a case in which all of protruding portion of the rib is cut out, in which about half of the protruding portion of the rib is cut out, and in which no oil guide groove is provided.
Figure 3B:
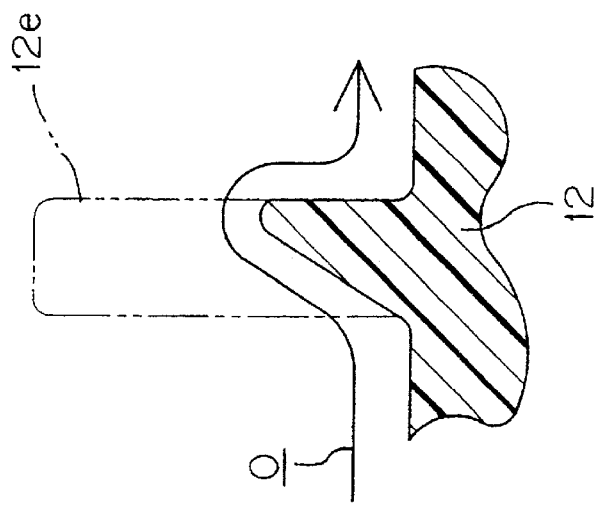
Figure 3C:
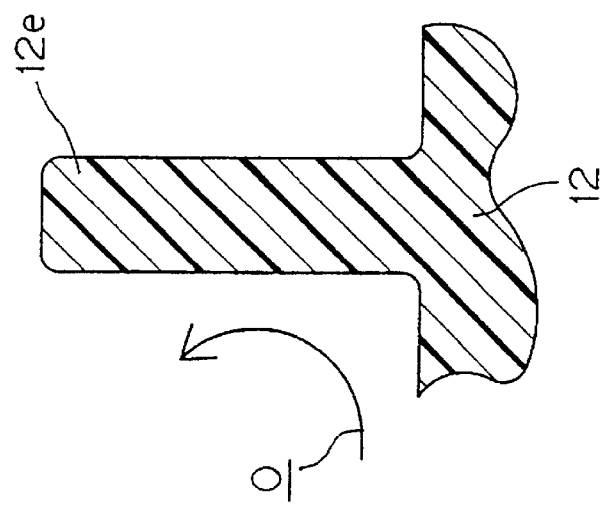
Figure 6:
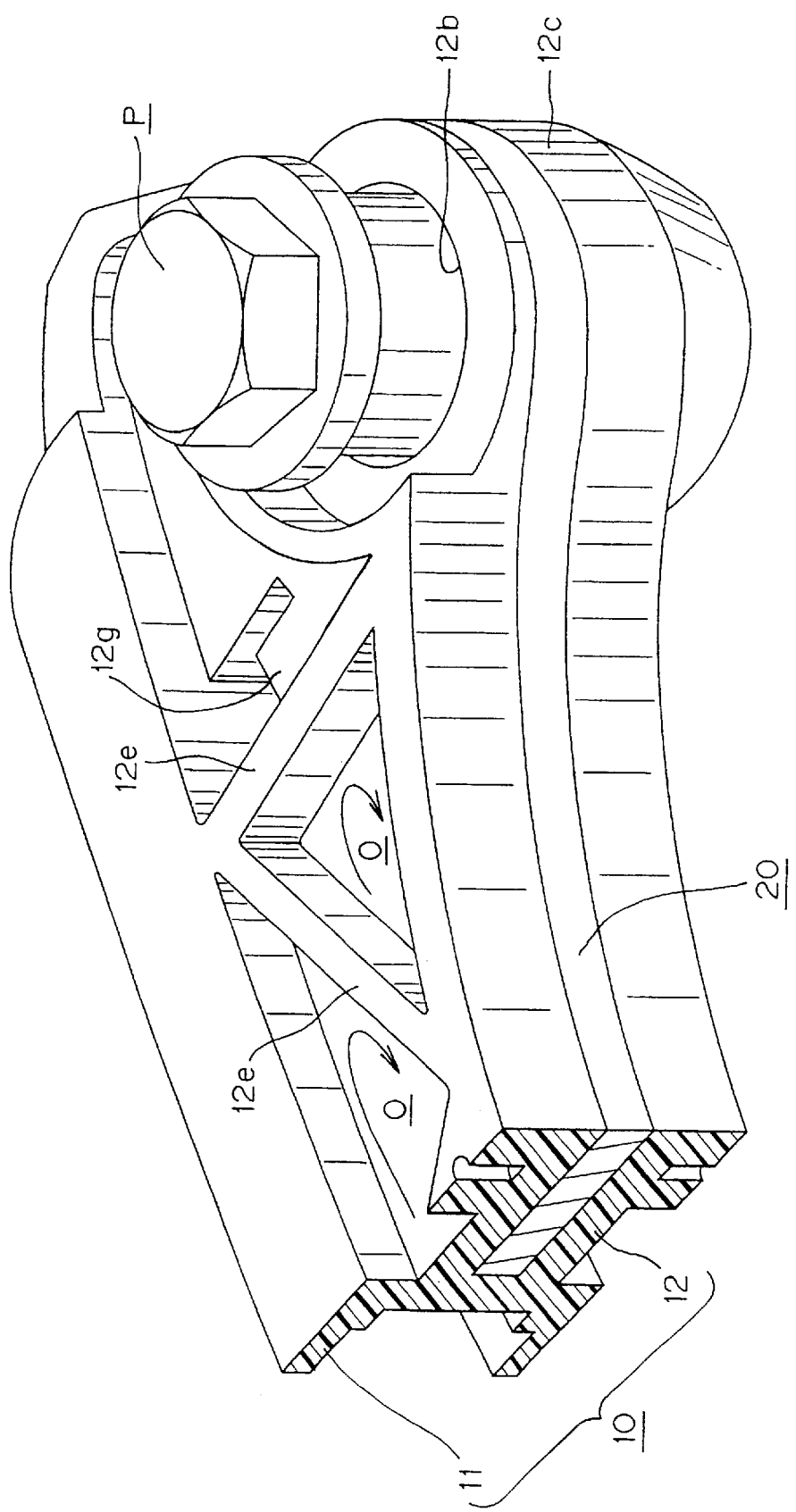
FIG. 6 is an enlarged view of a portion of the lever of FIG. 5.

The engine oil O passes smoothly downward through oil guide grooves 12f (FIGS. 1 and 2), which are in the form of notches in end portions of the ribs 12e, without being stopped as in FIGS. 6 and 3(c), and flows past the ribs as shown in FIGS. 3(a) and 3(b).

As shown in FIG. 2, the engine oil O flows into the mounting hole 12b in the lever body 10 and into the cofastening mounting hole 21 in the steel reinforcing plate 20, so that a sufficient quantity of oil penetrates between the steel reinforcing plate 20 and the mounting bolt P.

As illustrated in FIG. 4, since the oil guide grooves in the reinforcing ribs promote downward flow of lubricant adhering to the lever body so that adequate lubricant penetrates between the steel reinforcing plate and the mounting bolt P, the lever pivots smoothly, and without seizing, about the bolt P in cooperation with tensioner T, and applies appropriate tension to the transmission chain C as it slides on the chain contacting surface of the lever body.

Although the movable lever described above utilizes a molded resin lever body having oil guide grooves 12f in its reinforcing ribs 12e, similar oil guide grooves may be provided in reinforcing ribs of a die cast aluminum chain tensioning lever to prevent seizing of the lever on its supporting shaft.

The advantages of the invention may be summarized as follows.

First, since the lever body includes an integrally molded chain-engaging shoe and a plate-receiving portion on the back side of the shoe, the lever body itself presents a sliding surface to the transmission chain. It is not necessary to provide a separate shoe member. Accordingly, the invention achieves a reduction in the number of parts of the tensioner lever, and also in the number of steps required for its production.

Second, the steel reinforcing plate fits into a longitudinally extending slot which opens in a direction away from the back of the shoe, and extends perpendicular to the chain-contacting surface of the shoe, significantly increasing the rigidity and strength of the lever, and reducing its weight when compared to a conventional tensioner lever having a reinforcing element provided in parallel with the chain-contacting surface of the shoe. Additionally, the reinforcing plate fits into the lever body in a simple manner, and can be produced accurately by a punching press. Therefore the difficulty and cost of assembly are low, and assembly can be automated.

Third, even if there is a difference in the coefficients of thermal expansion between the lever body and the steel reinforcing plate, the fact that the lever body and plate are mounted on a shaft at one end of the lever by cofastening holes, and their other ends can move longitudinally relative to each other, prevents deformation and breakage of the lever due to thermal effects.

Finally, the oil guide grooves, formed as notches in end portions of the reinforcing ribs, promote downward flow of oil, which adheres to the lever body, to the vicinity of the cofastening mounting holes along the longitudinal direction of the lever. Therefore the space between the steel reinforcing plate and the lever supporting shaft is always lubricated by an adequate quantity of oil, and the lever, in cooperation with a tensioner, pivots smoothly on the shaft without seizing, and reliably applies appropriate tension to the transmission chain.

What is claimed is:

1. A movable tensioning lever for a transmission chain comprising an elongated lever body and a steel reinforcing plate, in which:

the lever body includes a shoe having front and back sides, the front side being a surface for sliding contact with a chain, and a plate-receiving portion on the back side of the shoe, extending along the longitudinal direction of the lever body, and having an elongated slot also extending along the longitudinal direction of the lever body and opening in a direction facing away from the shoe in a direction perpendicular to said front side;

the shoe and plate-receiving portion are integrally molded as a unit from synthetic resin;

the steel reinforcing plate fits into said slot;

the lever body and the reinforcing plate have coaxial mounting holes in register with each other adjacent one end of the lever body for cofastening engagement with a supporting shaft mounted on an inner wall of an engine; and a plurality of reinforcing ribs are formed on an a laterally outward facing surface of said plate-receiving portion, the reinforcing ribs being disposed in an array extending from the vicinity of said mounting holes along the plate-receiving portion in the longitudinal direction of the lever body;

wherein the improvement comprises:

oil guide grooves, for guiding oil to said mounting holes, the grooves being composed of notches formed in end portions of said reinforcing ribs.

* * * * *